(12) United States Patent
Muhanna et al.

(10) Patent No.: US 10,887,295 B2
(45) Date of Patent: Jan. 5, 2021

(54) SYSTEM AND METHOD FOR MASSIVE IOT GROUP AUTHENTICATION

(71) Applicant: Futurewei Technologies, Inc., Plano, TX (US)

(72) Inventors: Ahmad Shawky Muhanna, Richardson, TX (US); Xiang Xie, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 153 days.

(21) Appl. No.: 15/720,666

(22) Filed: Sep. 29, 2017

(65) Prior Publication Data
US 2018/0115539 A1    Apr. 26, 2018

Related U.S. Application Data

(60) Provisional application No. 62/413,316, filed on Oct. 26, 2016.

(51) Int. Cl.
*H04L 29/06* (2006.01)
*H04W 88/02* (2009.01)
(Continued)

(52) U.S. Cl.
CPC .......... *H04L 63/065* (2013.01); *H04L 63/061* (2013.01); *H04L 63/062* (2013.01);
(Continued)

(58) Field of Classification Search
CPC ... H04L 63/065; H04L 63/104; H04L 63/062; H04L 63/061; H04L 63/0876; H04W 88/02; H04W 12/04; H04W 12/06
See application file for complete search history.

(56) References Cited

U.S. PATENT DOCUMENTS

| 6,915,434 B1 * | 7/2005 | Kuroda | H04L 9/0833 380/278 |
| 8,495,363 B2 * | 7/2013 | Anchan | G06F 21/602 713/163 |

(Continued)

FOREIGN PATENT DOCUMENTS

| CN | 102238484 A | 11/2011 |
| CN | 103314605 A | 9/2013 |

(Continued)

OTHER PUBLICATIONS

Giustolisi, R., Gerhmann, C., Threats to 5G Group-Based Authentication, Jul. 2016, 13th International Conference on Security and Cryptography (SECRYPT 2016), Jul. 26-28, 2016, Madrid, Spain.*

(Continued)

*Primary Examiner* — David Garcia Cervetti
(74) *Attorney, Agent, or Firm* — Slater Matsil, LLP

(57) ABSTRACT

It is possible to reduce singling overhead in a radio access network by coordinating authentication of a group of UEs (e.g., IoT devices, etc.) via a master device. In particular, the master device may aggregate UE identifiers (UE_IDs) for UEs in the group, and send an identity message carrying the UE_IDs and a master device identifier (MD_ID) to a base station, which may then relay the identity message to a Security Anchor Node (SeAN). The SeAN may send an authentication data request carrying the UE_IDs and MD_ID to a Home Subscriber Server (HSS), which may return an authentication data response that includes a group authentication information. The group authentication information may then be used to achieve mutual authentication between the SeAN and each of the master device, group of UEs, and individual UEs.

26 Claims, 12 Drawing Sheets

(51) Int. Cl.
 H04W 12/04 (2009.01)
 H04W 12/06 (2009.01)
(52) U.S. Cl.
 CPC ........ *H04L 63/0876* (2013.01); *H04L 63/104*
 (2013.01); *H04W 12/0401* (2019.01); *H04W*
 *12/06* (2013.01); *H04W 88/02* (2013.01)

(56) References Cited

U.S. PATENT DOCUMENTS

| | | | | |
|---|---|---|---|---|
| 8,745,384 | B2* | 6/2014 | Persaud | H04L 63/0428 |
| | | | | 713/165 |
| 8,959,607 | B2* | 2/2015 | Yadav | H04L 9/0827 |
| | | | | 726/7 |
| 9,055,437 | B2* | 6/2015 | Kurokawa | H04L 65/1026 |
| 9,225,699 | B2* | 12/2015 | Biradar | H04L 63/068 |
| 9,270,672 | B2* | 2/2016 | Holtmanns | H04L 63/0869 |
| 9,298,901 | B1* | 3/2016 | Boss | G06F 21/31 |
| 9,451,462 | B2* | 9/2016 | Kim | H04W 8/005 |
| 9,462,464 | B2* | 10/2016 | Patil | H04W 12/003 |
| 9,860,221 | B2* | 1/2018 | Smith | H04L 63/061 |
| 2002/0154780 | A1* | 10/2002 | Fries | H04L 9/0836 |
| | | | | 380/277 |
| 2003/0204734 | A1* | 10/2003 | Wheeler | H04L 9/3271 |
| | | | | 713/184 |
| 2004/0025013 | A1* | 2/2004 | Parker | H04N 21/6175 |
| | | | | 713/163 |
| 2005/0097317 | A1* | 5/2005 | Trostle | H04L 63/0807 |
| | | | | 713/163 |
| 2008/0095362 | A1* | 4/2008 | Blom | H04L 9/321 |
| | | | | 380/45 |
| 2008/0162927 | A1* | 7/2008 | Wang | H04L 9/0833 |
| | | | | 713/155 |
| 2009/0054036 | A1* | 2/2009 | Chen | H04L 9/0833 |
| | | | | 455/411 |
| 2011/0307694 | A1* | 12/2011 | Broustis | H04L 9/0844 |
| | | | | 713/163 |
| 2013/0003972 | A1* | 1/2013 | Kang | H04L 9/0869 |
| | | | | 380/270 |
| 2013/0035067 | A1* | 2/2013 | Zhang | H04W 4/08 |
| | | | | 455/411 |
| 2013/0046983 | A1* | 2/2013 | Zhu | H04L 9/085 |
| | | | | 713/171 |
| 2013/0189955 | A1* | 7/2013 | Horn | H04W 8/186 |
| | | | | 455/411 |
| 2013/0291071 | A1 | 10/2013 | Blom et al. | |
| 2013/0315389 | A1* | 11/2013 | Jung | H04W 12/04031 |
| | | | | 380/31 |
| 2014/0075509 | A1* | 3/2014 | Holtmanns | H04W 12/0401 |
| | | | | 726/3 |
| 2014/0093082 | A1* | 4/2014 | Jung | H04L 9/0891 |
| | | | | 380/270 |
| 2014/0233736 | A1* | 8/2014 | Zhang | H04W 4/70 |
| | | | | 380/270 |
| 2014/0237559 | A1* | 8/2014 | Zhang | H04W 12/0401 |
| | | | | 726/4 |
| 2015/0012744 | A1* | 1/2015 | Chen | H04L 9/0866 |
| | | | | 713/155 |
| 2015/0149767 | A1* | 5/2015 | Oualha | H04W 12/0609 |
| | | | | 713/155 |
| 2015/0200942 | A1* | 7/2015 | Zhang | H04W 4/08 |
| | | | | 726/4 |
| 2015/0319172 | A1* | 11/2015 | Zhang | H04L 63/0869 |
| | | | | 713/169 |
| 2015/0358816 | A1* | 12/2015 | Zhang | H04L 63/08 |
| | | | | 726/12 |
| 2016/0182477 | A1* | 6/2016 | Zhang | H04L 63/065 |
| | | | | 726/7 |
| 2016/0269374 | A1* | 9/2016 | Smith | H04L 63/0435 |
| 2016/0323275 | A1* | 11/2016 | Choi | H04L 9/321 |
| 2016/0365975 | A1* | 12/2016 | Smith | H04L 9/0833 |
| 2017/0041782 | A1* | 2/2017 | Yu | H04W 12/04 |
| 2017/0127277 | A1* | 5/2017 | Yu | H04W 4/70 |
| 2017/0346798 | A1* | 11/2017 | Yu | H04L 9/3263 |

FOREIGN PATENT DOCUMENTS

| | | |
|---|---|---|
| CN | 104780052 A | 7/2015 |
| EP | 2228746 A1 | 9/2010 |

OTHER PUBLICATIONS

Roychoudhury et al., Hierarchical Group Based Mutual Authentication and Key Agreement for Machine Type Communication in LTE and Future 5G Networks, received Jul. 2016, published Jan. 2017.*

3GPP TS 33.102 V13.0.0, 3rd Generation Partnership Project; Technical Specification Group Services and System Aspects; 3G Security; Security Architecture (Release 13), Jan. 2016, 76 pages.

3GPP TS 33.401 V13.0.0, 3rd Generation Partnership Project; Technical Specification Group Services and System Aspects; 3GPP System Architecture Evolution (SAE); Security Architecture (Release 13), Sep. 2015, 131 pages.

* cited by examiner

SYSTEM AND METHOD FOR MASSIVE IOT GROUP AUTHENTICATION

This application claims priority to U.S. Provisional Application 62/413,316 entitled "System and Method for Massive IoT Group Authentication" and filed on Oct. 26, 2016, which is incorporated by reference herein as if reproduced in its entirety.

TECHNICAL FIELD

The present disclosure relates generally to wireless telecommunications, and, in particular embodiments, to systems and methods for massive Internet of Things (IoT) group authentication.

BACKGROUND

Modern wireless networks typically include various security features to prevent unauthorized third parties from access and/or manipulating data. In particular, long term evolution (LTE) networks provide three basic security features, namely: LTE authentication, non-access stratum (NAS) security, and access stratum (AS) security. The LTE authentication feature ensures that a user is an authorized subscriber to the network (or network service) that the user is attempting to access, while the NAS security and AS security features ensure that control and user data communicated over a radio access network (RAN) is secure at the NAS and AS levels, respectively.

SUMMARY

Technical advantages are generally achieved, by embodiments of this disclosure which describe systems and methods for massive Internet of Things (IoT) group authentication.

In accordance with an embodiment, a method of group authentication is provided. In this embodiment, the method includes receiving a group authentication request from a base station in a wireless network. The group authentication request includes a group authentication parameter (G_AUTN), a master authentication parameter (M_AUTN), and at least a group random number (G_RAND). The method also includes authenticating the wireless network by validating at least the M_AUTN in accordance with at least a master key associated with the master device, and sending user authentication requests to user equipment (UEs) in a group of UEs. Each of the user authentication requests carries at least the G_AUTN and the G_RAND. The method also includes receiving, by the master device, user authentication responses from at least some UEs in the group of UEs. The user authentication responses include individual response (RES(i)s). The method further includes sending a group authentication response carrying the RES(i)s to the base station. In one example, the RES(i)s are configured to be used for network-side authentication of individual UEs in the group of UEs. In that example, or in another example, each of the RES(i)s is generated in accordance with a different individual pre-provisioned key (K_key(i)) associated with a UE from which the corresponding user authentication response was received. In any of the aforementioned examples, or in another example, the method further includes generating a group response parameter (G_RES) based on a group key and the G_RAND carried by the group authentication request, and validating each of the user authentication responses received from UEs in the group of UEs by comparing the G_RES generated by the master device with a G_RES indicator carried by the corresponding user authentication response. In any of the aforementioned examples, or in another example, the method further includes generating a master device response parameter (M_RES) based on a master device key and the G_RAND carried by the group authentication request. The M_RES is included in the group authentication response. In any of the aforementioned examples, or in another example, the method further includes authenticating a home subscriber server (HSS) by validating a message authentication code (MAC) signature carried by the group authentication request in accordance with a home network public key, the G_RAND, and the G_AUTN. In any of the aforementioned examples, or in another example, the method further includes validating the G_AUTN in accordance with a group key associated with the group of UEs and the G_RAND carried by the group authentication request. In such an example, the M_AUTN may be validated in accordance with the master device key and the G_RAND or in accordance with the master key and a separate random number (RAND) carried by the group authentication request, where the separate RAND is different than the G_RAND. An apparatus for performing this method is also provided.

In accordance with another embodiment, another method for group authentication is provided. In this embodiment, the method includes receiving an authentication and data response message from a home subscriber server (HSS). The authentication and data response message includes an expected group response parameter (G_XRES) and a set of expected individual response parameters (XRES(i)s). The method further comprises receiving a group authentication response from a master device. The group authentication response carries a group response parameter (G_RES) and a set of individual response parameters (RES(i)s). The method further comprises authenticating a group of UEs when the G_RES in the group authentication response received from the master device matches the G_XRES in the authentication and data response message received from the HSS and authenticating individual UEs when a corresponding RES(i) in the group authentication response received from the master device matches a corresponding XRES(i) in the second set of RES(i)s in the authentication and data response message received from the HSS. In one example, the method further comprises authenticating the master device when a master device response parameter (M_RES) in the group authentication response received from the master device matches an expected master device response parameter (M_XRES) in the authentication and data response message received from the HSS. In that example, or in another example, the authentication and data response message further includes a group authentication vector (AV_G) and a master device authentication vector (AV_M). In such an example, the method may further comprise computing a group authentication parameter (G_AUTN) and a master authentication parameter (M_AUTN) based on the AV_G, the AV_M, and one or more random numbers (RANDs) and sending a group authentication request carrying the G_AUTN, the M_AUTN, and the one or more RANDs to the master device prior to receiving the group authentication response from the master device. An apparatus for performing this method is also provided.

In accordance with yet another embodiment, yet another method of group authentication is provided. In this embodiment, the method includes receiving a user authentication and data request message from a Security Anchor Node (SeAN). The user authentication and data request message includes a master device identifier (MD_ID) corresponding to a master device and a set of user equipment identifiers (UE_IDs). Each UE_ID in the set of UE_IDs corresponds to a different UE in a group of UEs. The method further comprises computing at least a group authentication vector (AV_G) based on a group key, a master authentication vector (AV_M) based on the MD_ID, and a set of individual response parameters (RES(i)s) based on the set of UE_IDs and sending a user authentication and data response message carrying the AV_G, the AV_M, and the set of RES(i)s to the SeAN. In one example, the method further includes generating a message authentication code (MAC) signature based on a home network private key in accordance with a group random number (G_RAND) and a group authentication parameter (G_AUTN), the G_RAND and the G_AUTN being included in the AV_G, where the MAC signature is included in the user authentication and data response message. In such an example, or another example, the method further includes computing a group response parameter (G_RES) based on the group key, where the G_RES is included in the user authentication and data response message. An apparatus for performing this method is also provided.

In accordance with yet another embodiment, yet another method for group authentication is provided. In this embodiment, the method includes receiving a user authentication request from a master device. The user authentication request includes a group authentication vector (G_AUTN) and a group random number (G_RAND). The method further includes authenticating an access network by validating the G_AUTN based on a group key and the G_RAND, computing an individual response parameters (RES(i)) based on a pre-provisioned key (K_key(i)) associated with the UE and the G_RAND, and sending a user authentication response carrying at least the RES(i) to the master device. In one example, the method further includes computing a group response parameter (G_RES) based on the group key and the G_RAND, where the G_RES is included in the user authentication response. In that example, or in another example, authenticating the access network by validating the G_AUTN based on the group key and the G_RAND comprises computing an independent G_AUTN based on the group key and the G_RAND, and authenticating the access network upon determining that the independent G_AUTN computed by the UE matches the G_AUTN carried by the user authentication request. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
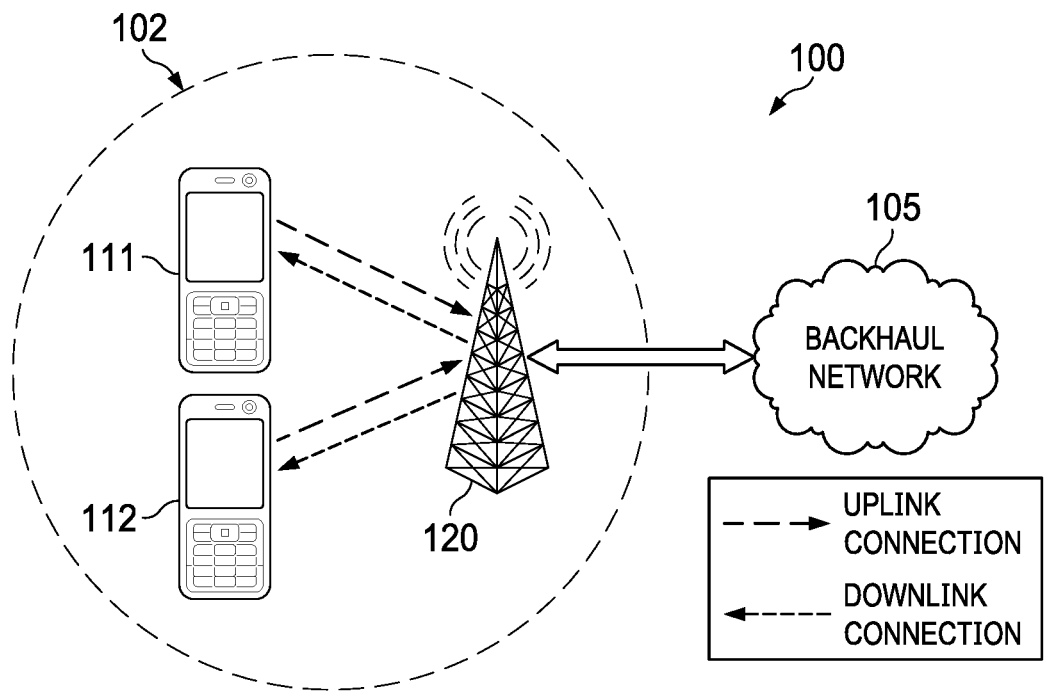
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. While the inventive aspects are described primarily in the context of 5G wireless networks, it should also be appreciated that those inventive aspects may also be applicable to 4G and 3G wireless networks.

The Internet of Things (IoT) generally refers to a vast network of connected devices or "things" (e.g., vehicles, electronic sensors, etc.) that collect and exchange data over a global infrastructure. In order to support IoT-related services, next generation wireless networks, such as 5G and LTE, will need to be capable of authenticating vast numbers of devices using limited spectrum resources. Current LTE authentication and NAS security protocols usually require each UE to individually send and receive security and authentication information with a base station in order to establish mutual authentication with the serving network.

Aspects of this disclosure reduce singling overhead in the radio access network by coordinating authentication of a group of UEs (e.g., IoT devices, etc.) via a master device, such as an IoT relay. In particular, the master device may aggregate UE identifiers (UE_IDs) for UEs in the group, and send an identity message carrying the UE_IDs and a master device identifier (MD_ID) to a base station, which may then relay the identity message to a Security Anchor Node (SeAN). The SeAN may send an authentication data request carrying the UE_IDs and MD_ID to a Home Subscriber Server (HSS), which may return an authentication data response that includes a group authentication vector (AV_G), a master device authentication vector (AV_M), a group response parameter (G_XRES), and a set of individual expected response parameters (XRES(i)s) to the SeAN. The SeAN then communicate the received group authentication parameter (G_AUTN) and a master authentication parameter (M_AUTN) based on the AV_G, the AV_M, and a group random number (G_RAND), and sends a group authentication request that includes the G_AUTN, the M_AUTN, and the G_RAND to the master device. The master device authenticates the wireless network by validating the M_AUTN using the master key and the G_RAND, and then sends user authentication requests carrying the G_AUTN and the G_RAND to UEs in the group of UEs. Each of the UEs authenticate the wireless network by validating the G_AUTN based on a group key and the G_RAND. After authenticating the wireless network, each UE computes its own RES(i) based on a pre-provisioned key (K_key(i)) of the corresponding UE and the G_RAND, as well as a G_RES based on the group key and the G_RAND. Thereafter, the UEs send user authentication responses carrying the RES(i)s and the G_RES to the master device, which may validate the G_RES carried by the user authentication responses prior to sending a group authentication response carrying the G_RES and the set of RES(i)s to the SeAN. Upon receiving the group authentication response, the SeAN authenticates the group of UEs by comparing the G_RES received from the master device with the G_XRES received from the HSS, as well as authenticates individual UEs within the group of UEs by comparing each RES(i) in the set of RES(i)s received from the master device with a corresponding XRES(i) in the set of XRES(i)s received from the HSS. The identity and/or group authentication messages may be exchanged using an Evolved Packet System (EPS)-Authentication and Key Agreement (EPS-AKA) protocol or a mutual authentication and security agreement (MASA) protocol depending on the level of security and overhead/complexity that is desired. When the MASA protocol is used, additional encryption steps may be taken to protect and/or validate primate security information/parameters carried by the identity and/or group authentication messages. These and other details are explained in greater detail below.

FIG. 1 illustrates a network 100 for communicating data. The network 100 comprises a base station 120 having a coverage area 102, a plurality of UEs 111, 112, and a backhaul network 105. As shown, the base station 120 establishes uplink (dashed line) and/or downlink (dotted line) connections with the UEs 111, 112, which serve to carry wireless transmission from the UEs 111, 112 to the base station 120 and vice-versa. Wireless transmission over the uplink/downlink connections may include data communicated between the UEs 111, 112, as well as data communicated to/from a remote-end (not shown) by way of the backhaul network 104. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), an IoT device (e.g., a smart sensor, etc.) and other wirelessly enabled devices. In some embodiments, the network 100 may comprise various other wireless devices, such as relays, low power nodes, etc.

Figure 2:
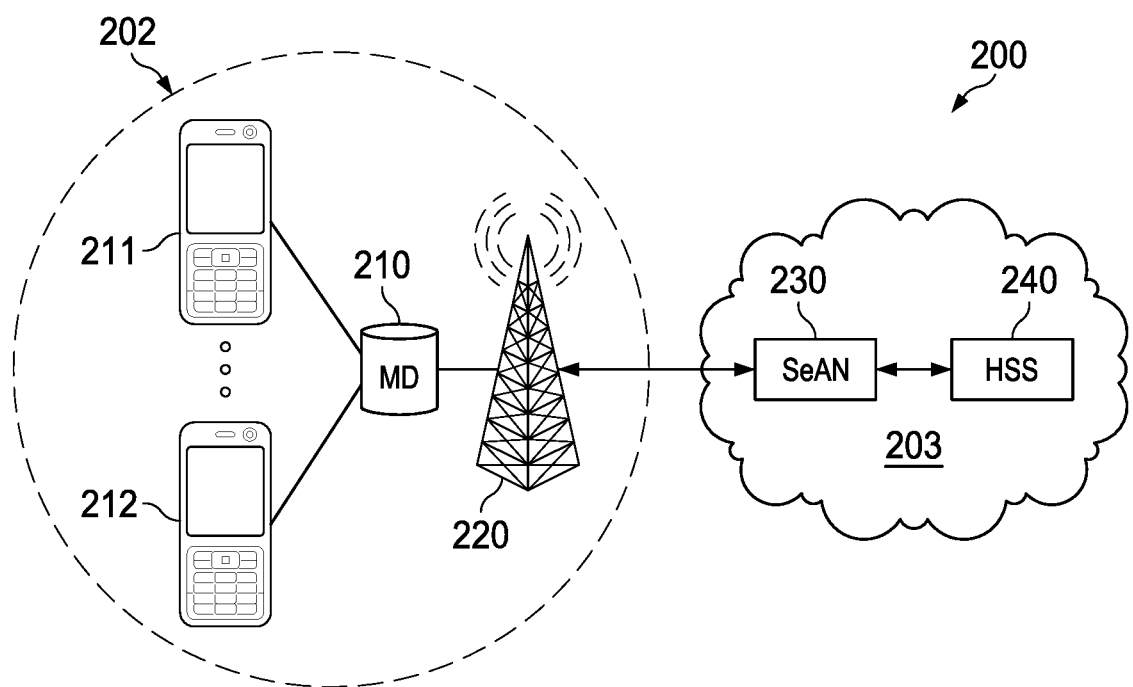
FIG. 2 is a diagram of another embodiment wireless communications network.

FIG. 2 illustrates a wireless network 200 that includes a radio access network (RAN) 202 and a core network 203. The RAN 202 includes a base station 220, which provides wireless access to a master device 210 and a group of UEs 211, 212. The master device 210 may be any wirelessly enabled device (e.g., an IoT gateway, an IoT relay, etc.) that is configured to facilitate mutual authentication between the wireless network 200 and the group of UEs 211, 212. The core network 203 includes a Security Anchor Node (SeAN) 230 and a home subscriber server (HSS) 240. The SeAN 230 manages security keys and provides ciphering/integrity protection for network access stratum (NAS) signaling exchanged between the UEs 211, 212 and the core network 203. It should be appreciated that the "SeAN" may provide similar functionality as a mobility management entity (MME) and/or a Security Access Function (SeAF), and that the terms "MME," "SeAN," and "SeAF" are used interchangeably throughout this document. The HSS 240 is a central database that stores user-related and subscription-related information, and is responsible for user authentication and access authorization.

Figure 3:
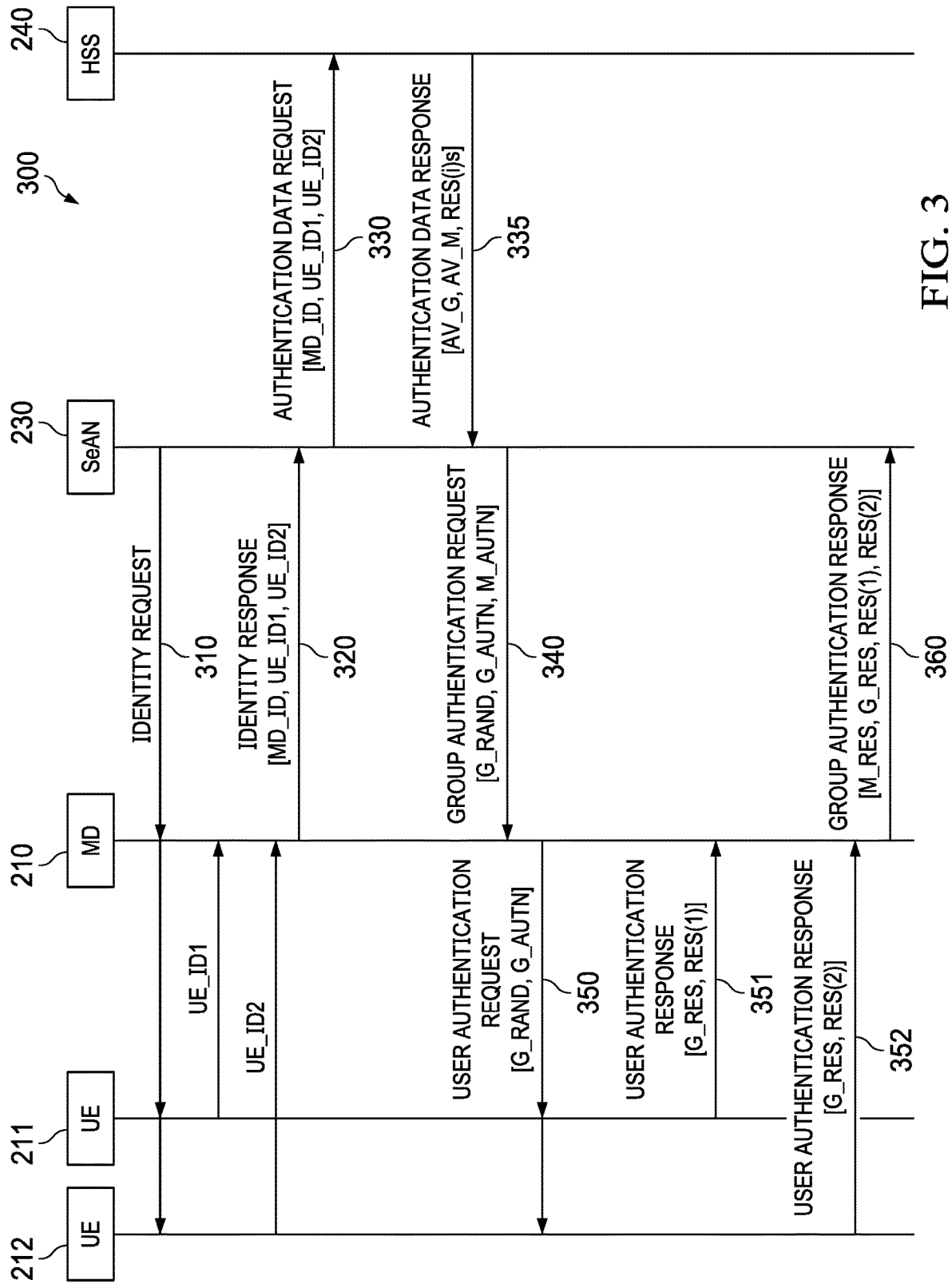
FIG. 3 is a protocol diagram of an embodiment communications sequence for group authentication.

Aspects of this disclosure provide techniques for coordinating the authentication of a group of UEs by exchanging group authentication messages between a master device and network devices. FIG. 3 illustrates a protocol diagram of an embodiment communications sequence 300 for authenticating the group of UE 211, 212 in accordance with an EPS-AKA group authentication protocol. Although the base station 220 is not shown in FIG. 3, it should be appreciated that messages exchanged between the master device 210 and the SeAN 230 are relayed via the base station 220.

As shown, the communications sequence 300 begins when the SeAN 230 communicates an identity request 310 to the master device 210, which forwards the identity request 310 to the UEs 211, 212. The identity request 310 may request user specific information of wireless devices attempting to access the RAN 202, and may prompt the UEs 211, 212 to return a first UE-specific identifier (UE_ID1) and a second UE specific identifier (UE_ID2), respectively, to the master device 210. The master device 210 may then send an identity response 320 to the SeAN 230 that includes the UE_ID1, the UE_ID2, and a master device identifier (MD_ID). The UE_ID1, UE_ID2, and MD_ID may be identifiers (e.g., an international mobility subscriber identity (IMSI), etc.) assigned to the UE 211, the UE 212, and the master device 210, respectively. The SeAN 230 then sends the UE_ID1, UE_ID2, and MD_ID in an authentication data request 330 to the HSS 240. Upon reception, the HSS 240 computes a group authentication vector (AV_G) based on a group key associated with the group (e.g., a group "K" key). In some embodiments, the AV_G may include the following information: G-RAND, G_AUTN, G-Kasmi, and G_XRES) of UEs, a master device authentication vector (AV_M) based on a master key assigned to the master device 210, and a plurality of individual response (XRES(i)s) based on pre-provisioned keys (K_Keys) assigned to each of the UEs. The HSS 240 then sends the AV_M, the AV_G, and the XRES(i)s in an authentication data response 335 to the SeAN 230. Upon receiving the group authentication request 340, the SeAN 230 communicate a group authentication parameter (G_AUTN) and (G_RAND) based on the AV_G as well as a master authentication parameter (M_AUTN) based on the AV_M, and sends a group authentication request 340 carrying the G_AUTN, the M_AUTN, and the G_RAND to the master device 210. Although the group authentication request 340 is shown as including a single group random number (G_RAND), it should be appreciated that multiple random numbers may be carried in the group authentication request 340 when the M_AUTN is computed using a random number that is different than the G_RAND. Upon receiving the group authentication request 340, the master device 210 may authenticate the network by validating the M_AUTN and the G_AUTN in accordance with the master key assigned to the master device 210, a group key assigned to the group of UEs 211, 212, and the random number(s) carried by the group authentication request 340. In particular, the master device may compute its own M_AUTN based on the master key and the G_RAND (or another random number), and compare the M_AUTN computed by the master device with the M_AUTN carried by the group authentication request 340. If they match, then the M_AUTN carried by the group authentication request 340 is validated, and the wireless network is authenticated. Similarly, the master device may validate the G_AUTN by computing a separate G_AUTN based on the group key and the G_RAND, and comparing the G_AUTN computed by the master device with the G_AUTN carried by the group authentication request 340. In some embodiments, the master device only validates the M_AUTN without validating the G_AUTN when authenticating the wireless network. In other embodiments, the master device validates both the M_AUTN and the G_AUTN when authenticating the wireless network. The master device 210 may also compute a group response (G_RES) based on the group key and the G_RAND. After authenticating the M_AUTN and the G_AUTN and computing the G_RES, the master device 210 may send a user authenticating request 350 carrying the G_AUTN and the G_RAND to the UEs 211, 212. The UE 211 may authenticate the G_AUTN based on the group key and the G_RAND, and compute an individual response (RES(1)) according to a pre-provisioned key (K_key(1)) of the UE 211 and the G_RAND. Likewise, the UE 212 may authenticate the G_AUTN, and compute an individual response (RES(2)) according to a pre-provisioned key (K_key(2)) of the UE 212 and the G_RAND. The UEs 211, 212 may also compute their own G_RES based on the group key and the G_RAND. After authenticating the G_AUTN and computing the RES(1), RES(2), and G_RES, the UEs 211, 212 may send user authentication responses 351, 352 to the master device 210. The user authentication response 350 carries the G_RES and the RES(1), and the user authentication response 352 carries the G_RES and the RES(2). The master device 210 may validate the user authentication responses 251, 252 by comparing the G_RES computed by the master device 210 with the G_RES carried by the user authentication responses 351, 352. The master device 210 may then compute a master device response (M_RES), and send a group authentication response 350 carrying the G_RES, the RES(1), and the RES(2) to the SeAN 230. The SeAN 230 may then compare the G_RES, M_RES, RES(1), and, RES(2) carried by the group authentication response 250 received from the master device 210 with the G_XRES, M_XRES, XRES(1), and XRES(2) carried by the authentication data response 335 received from the HSS 240 to collectively authenticate the group of UEs 211, 212 and individually authenticate each of the UEs 211, 212 in the group.

Notably, the group key is known by the HSS 240 and the master device 210, and each UE that is admitted to the group. Unlike the group key, the master key is pre-provisioned to the master device 210, and is not known to any of the UEs. In this way, authentication of the M_AUTN may provide the master device an individual level of security than authentication of the G_AUTN.

In some embodiments, group authentication messages may be generated using MASA integrity and encryption techniques described in U.S. patent application Ser. No. 15/453,776 entitled "Authentication Mechanism for 5G Technologies" filed on Mar. 8, 2017, which is incorporated herein by reference as if reproduced in its entirety. MASA integrity and encryption techniques may provide additional layers of encryption and integrity protection for information exchanged between the master device 210 and the SeAN 230.

In particular, embodiment MASA-group authentication protocols may encrypt group specific information (e.g., an IMSI, etc.) that is communicated in a group authentication message using an initial authentication request message (IAR) encryption key ($KIAR_{ENC}$) and/or an initial authentication response (IAS) encryption key ($KIAS_{ENC}$). Additionally, embodiment MASA protocols may use an IAR integrity protection key ($KIAR_{INT}$) and/or an IAS integrity protection key ($KIAS_{INT}$) to verify the integrity of information in a group authentication message. The $KIAR_{ENC}$, $KIAR_{INT}$, $KIAS_{ENC}$, and/or $KIAS_{INT}$ may be independently computed by the master device and a home subscriber server (HSS) based on, for example, a master device key of the master device and one or more random numbers (e.g., RAND1, RAND2), and/or a COUNTER. Using a COUNTER to compute an instance of a given key may be useful in ensuring that each generated instance of the key differs from previous generated instances of the key, as it is possible that the same random number could be selected to generate different instances of a key, which could constitute a security vulnerability.

It should be appreciated that, in the context of MASA, group authentication requests and group authentication responses may be referred to as IAR messages and IAS messages, respectively.

Figure 4:
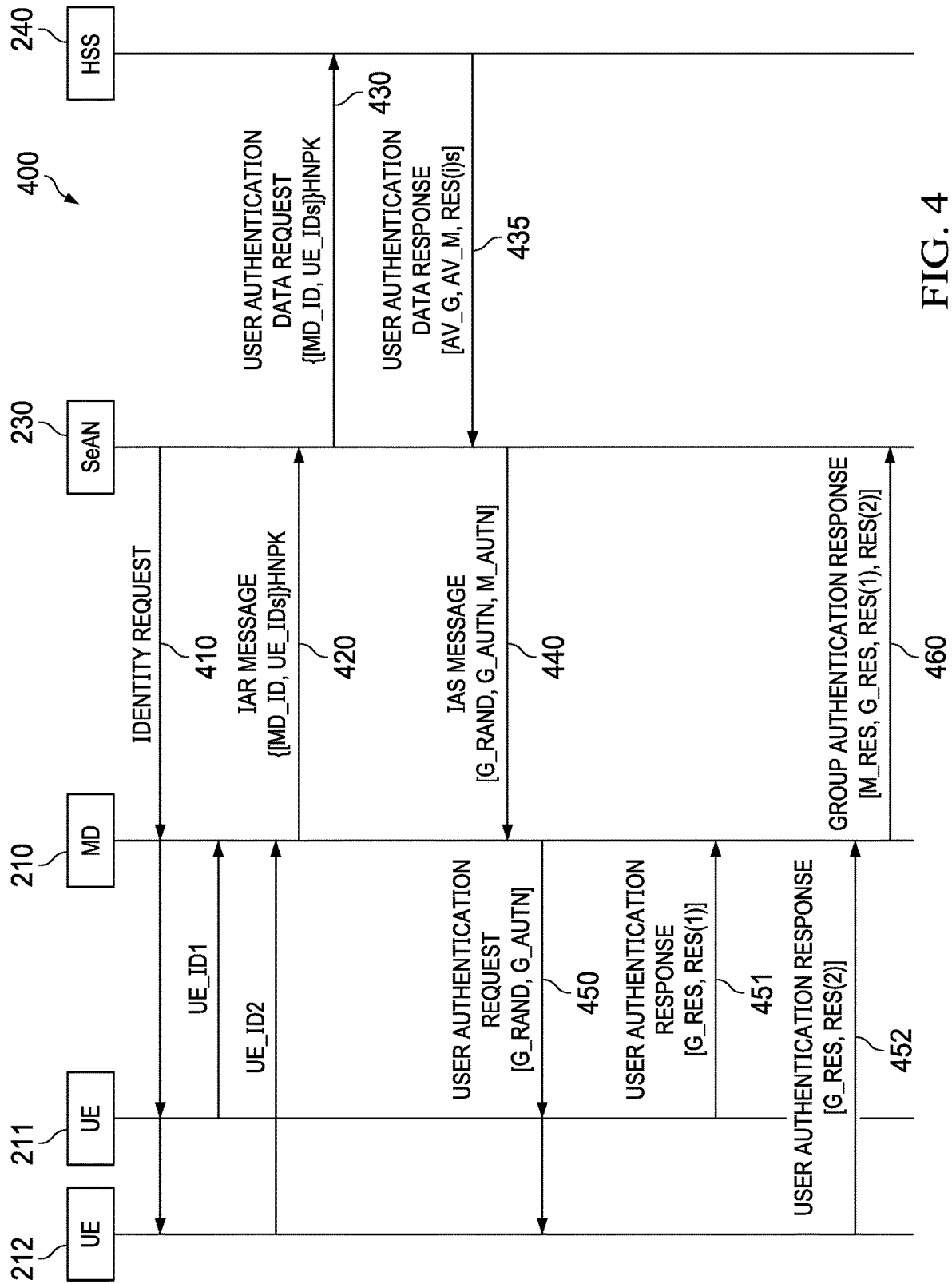
FIG. 4 is a protocol diagram of another embodiment communications sequence for group authentication.

FIG. 4 illustrates a protocol diagram of an embodiment communications sequence 400 for authenticating the group of UE 211, 212 in accordance with a MASA-group authentication protocol. Similar to FIG. 3, it should be appreciated that messages exchanged between the master device 210 and the SeAN 230 are relayed via the base station 220.

As shown, the communications sequence 400 begins when the SeAN 230 communicates an identity request 410 to the master device 210. The identity request 410 is similar to the identity request 310, and is relayed from the master device 210 to the UEs 211, 212, which in turn send UE_ID1 and the UE_ID2 to the master device 210. Thereafter, the master device 210 computes a message authentication code (MAC) signature by computing a hash of group specific information (e.g., the MD_ID, the UE_ID1, and the UE_ID2, etc.) using an IAR integrity protection key ($KIAR_{INT}$), and then encrypts the group specific information along with the MAC signature using a home network public key (HPuK) to obtain an encrypted portion. The group specific information generally includes the MD_ID and a separate UE_ID for each UE in the group. The group specific information may also include security capability information associated with the master device 210 and/or UEs 211, 212, such as NAS ciphering algorithms supported by the master device 210 and/or UEs 211, 212. The group specific information may also include one or more random numbers and/or a counter used to compute the $KIAR_{INT}$.

The master device 210 sends an initial authentication request (IAR) message 420 carrying the encrypted portion to the base station 220, which relays the IAR message 420 to the SeAN 230. The IAR message 420 may also include an unencrypted home network ID (HID) associated with a home network of the master device 210.

Upon receiving the IAR message 420, the SeAN 230 may identify the home network of the master device 210 based on the unencrypted HID, and communicate an authentication and data request message 430 to the HSS 240, which is associated with, or otherwise located in, the identified home network. Upon receiving the authentication and data request message 430, the HSS 240 may decrypt the encrypted portion using a home network private key (HPrK), and verify the integrity of the encrypted portion based on the MAC signature. The HPuK and the HPrK may form a public-private key pair such that information encrypted with the HPuK can only be decrypted with the HPrK.

The HSS 240 may independently generate a MAC signature by computing a hash of the information in the authentication and data request message 430 using an independently generated integrity key (e.g., a $KIAR_{INT}$), and then compare the independently generated MAC signature with the MAC signature carried by the encrypted portion in the authentication and data request 430. The HSS 240 may also take further steps to validate the encrypted portion of the authentication and data request message 430. For example, the HSS 240 may verify that a COUNTER in the encrypted portion of the authentication and data request message 430 (e.g., a counter originally in the IAR message 420) exceeds an independent COUNTER maintained by the HSS 240 in order to confirm that the encrypted portion in the authentication and data request message 430 is fresh (e.g., not stale). If the encrypted portion is stale, then it may have been intercepted by a malicious man-in-the-middle entity.

After verifying the integrity of the encrypted portion(s), the HSS 240 may compute the AV_G, the AV_M, and the RES(i)s using a similar technique as discussed in relation to FIG. 3, and send the AV_M, the AV_G, and the RES(i)s in an authentication and data response message 435 to the SeAN 230. The authentication and data response message 435 may include other information in addition to the AV_G, the AV_M, and the RES(i)s, such as integrity/encryption keys (e.g., a $KIAS_{INT}$, $KIAS_{ENC}$, etc.), the IMSI of the UE, a COUNTER, and/or a security capabilities. The SeAN 230 may then compute the G_AUTN and the M_AUTN, and send an IAS message 440 that includes the G_AUTN, the M_AUTN, and the G_RAND to the master device 210. The IAS message 440 may have various different frame formats, and the contents of the IAS message 440 may vary depending on the frame format being used. In one example, the G_AUTN, the M_AUTN, and the G_RAND, as well as other information in the IAS message 440, are encrypted using a $KIAS_{ENC}$ to form an encrypted portion, which is included in the IAS message 440. In some examples, a hash of the G_AUTN, the M_AUTN, and the G_RAND, as well as other information in the IAS message 440, is computed using a $KIAS_{INT}$ to generate a MAC signature, which is included in the IAS message 440 to provide integrity protection. Upon receiving the IAS message 440, the master device may decrypt the encrypted portion using the $KIAS_{ENC}$ and/or validate the MAC signature using the $KIAN_{INT}$, authenticate the M_AUTN and the G_AUTN, compute the G_RES, and send a user authentication request 450 carrying the G_AUTN and the G_RAND to the UEs 211, 212. The UEs 211, 212 may then validate the G_AUTN, generate the RES(1), RES(2), and G_RES, and send user authentication responses 451, 452 to the master device 210. Upon receiving the user authentication responses 451, 452, the master device may authenticate the G_RES carried by the user authentication responses 451, 452, and send a group authentication response 460 carrying the G_RES, M_RES, RES(1), and RES(2) to the SeAN 230, which may then authenticate the UEs 211, 212 (both individually and collectively as a group) according to the G_RES, the RES(1), and the RES (2), and the master device 210 according to the M_RES.

Figure 5:
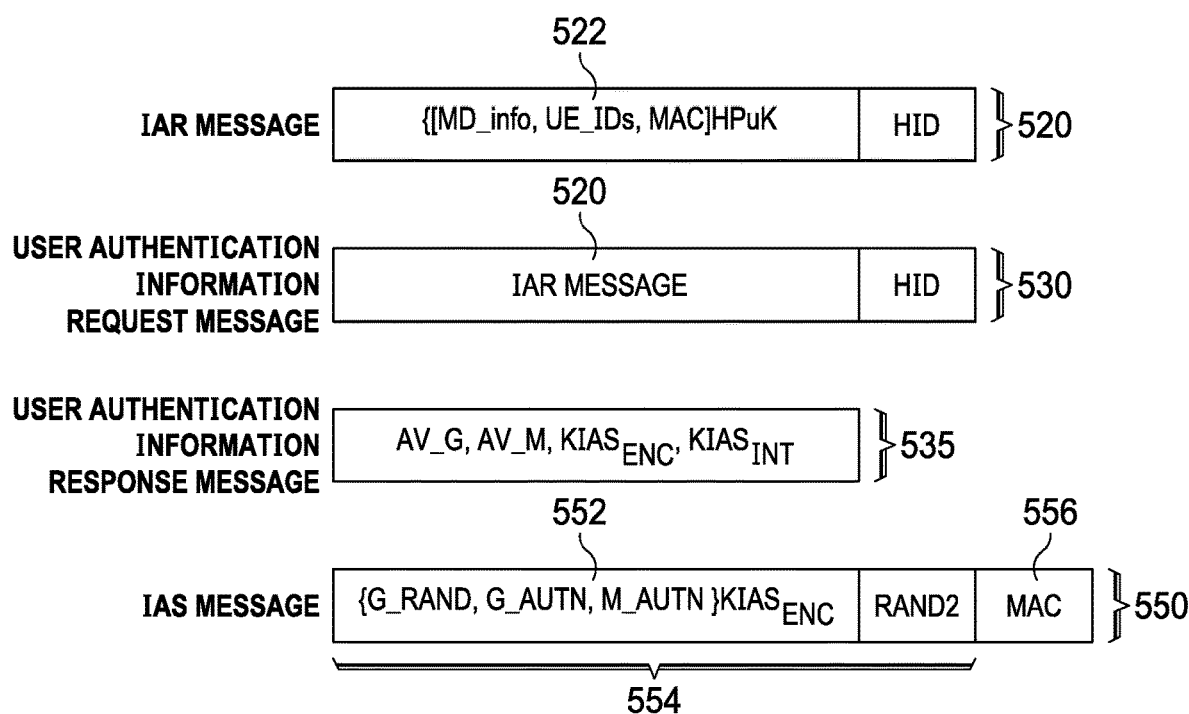
FIG. 5 is a diagram of embodiment frame formats for group and user messages exchanged during the embodiment communications sequence depicted by FIG. 4.

As mentioned above, the IAR message 420, the authentication and data request message 430, the user authentication data response message 435, and the IAS message 440 may have various different frame formats. FIG. 5 illustrates frame formats for an embodiment IAR message 520, an embodiment authentication and data request message 530, an embodiment authentication and data response message 535, and an embodiment IAS message 550.

The embodiment IAR message 520 includes an MD_info, UE_IDs, a MAC signature, and a home network identifier (HID). The MD_info may include various information associated with, or generated by, the master device 210, including (but not limited to) an MD_ID, one or more random numbers (e.g., RAND1, RAND2, etc.), a counter, and/or security capability parameters. The MAC signature may be generated by computing a hash function of the MD_info according to an integrity key (e.g., a $KIAR_{INT}$) and/or a random number (e.g., RAND1). The MAC signature and the MD_info are encrypted using a HPuK to form an encrypted portion 522 of the embodiment IAR message 520.

The embodiment authentication and data request message 530 includes the embodiment IAR message 520 and an HID. The embodiment authentication and data response message 535 includes MD_info (e.g., an IMSI, counter, RAND1, RAND2, security capabilities, etc.), as well as the AV_G, the AV_M, a $KIAS_{ENC}$, and a $KIAS_{INT}$. The embodiment IAS message 550 includes an encrypted inner portion 552, an outer portion 554, and a MAC signature 556. The encrypted inner portion 552 is formed by encrypting the AVs using a $KIAS_{ENC}$. It should be appreciated that the encrypted inner portion 552 may include other information (e.g., a KSI) in addition to the AVs. The outer portion 554 includes a RAND2 and the encrypted inner portion 552. The MAC signature 556 may be generated by computing a hash of the outer portion 554 using the $KIAS_{INT}$.

Figure 6:
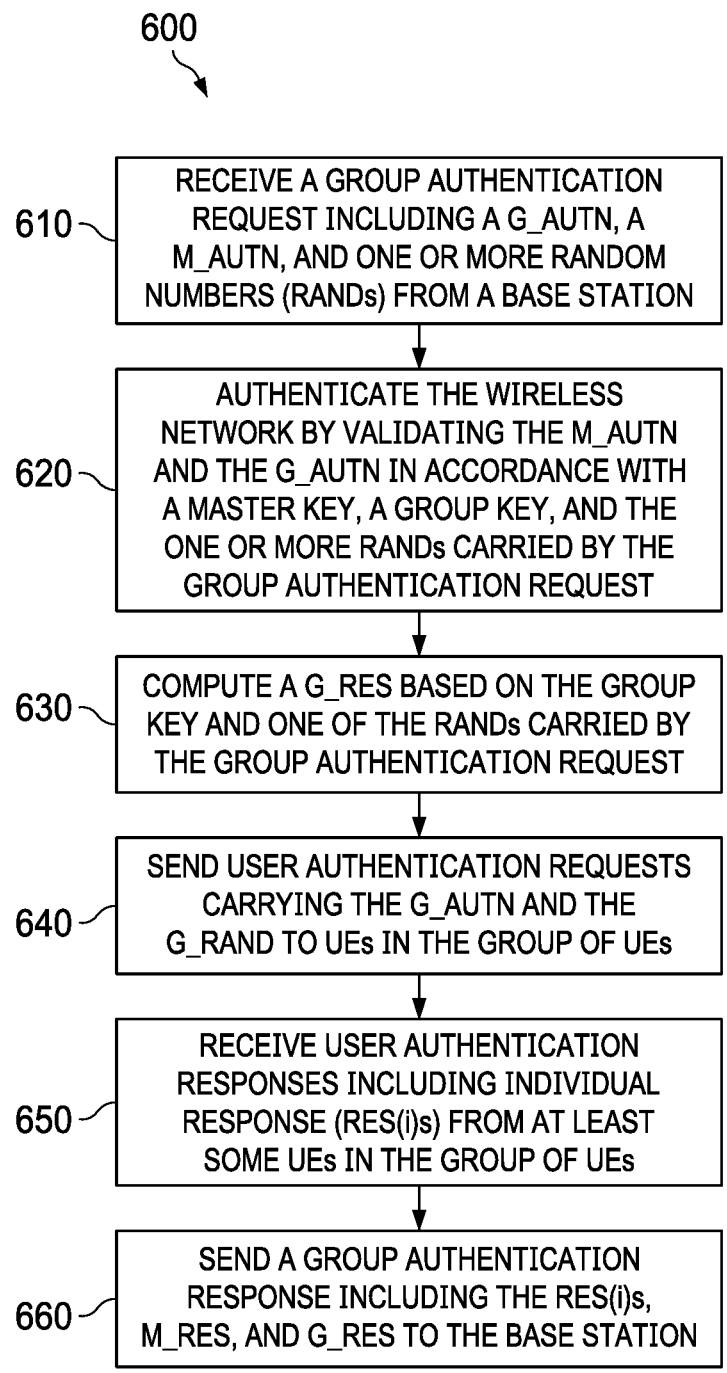
FIG. 6 is a flowchart of an embodiment method for facilitating authentication between an access network and a group of UEs.

Aspects of this disclosure provide embodiment methods for achieving, or otherwise facilitating, authentication between an access network and a group of UEs. FIG. 6 is a flowchart of an embodiment method 600 for facilitating authentication between an access network and a group of UEs, as may be performed by a master device.

At step 610, the master device receives a group authentication message including a G_AUTN, a M_AUTN), and one or more RANDs from a base station in a wireless network.

At step 620, the master device authenticates the wireless network by validating the M_AUTN and the G_AUTN in accordance with a master key assigned to the master device, a group key associated with a group of UEs, and the one or more RANDs carried by the group authentication message. At step 630, the master device computes a G_RES based on the group key and one of the RANDs (e.g., the G_RAND) carried by the group authentication request. At step 640, the master device sends user authentication requests carrying the G_AUTN and the G_RAND to UEs in the group of UEs. At step 650, the master device receives user authentication responses including RES(i)s from at least some UEs in the group of UEs. At step 660, the master device sends a group authentication response including the RES(i)s, M_RES, and G_RES to the base station.

Figure 7:
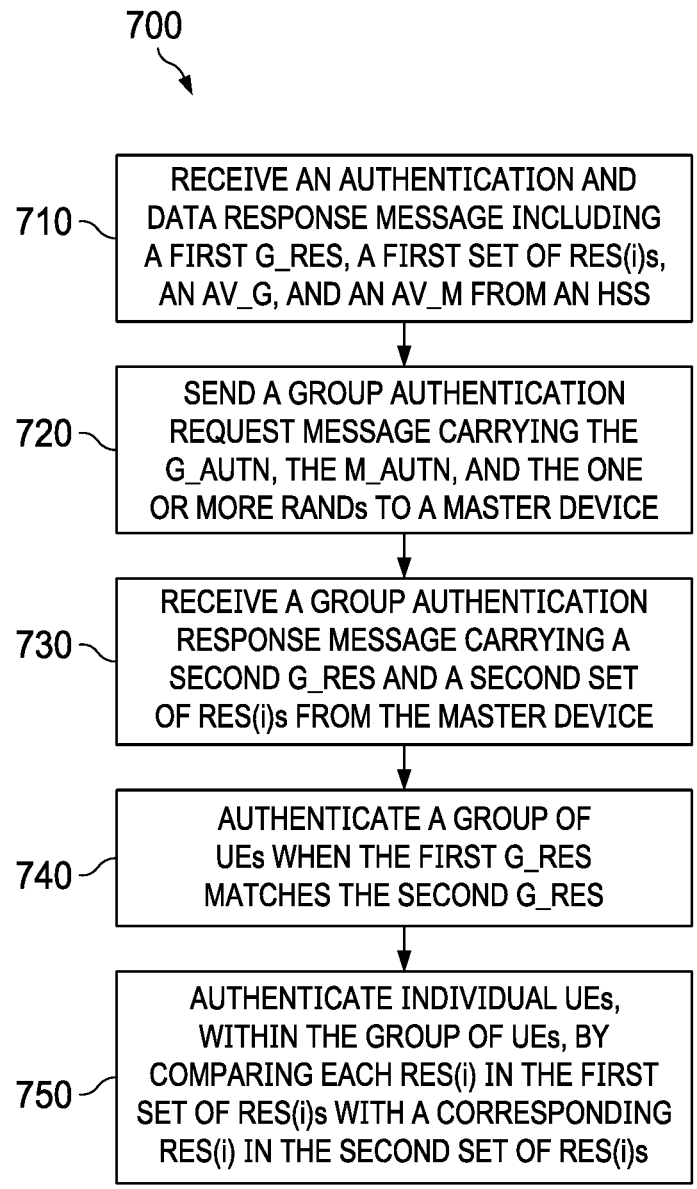
FIG. 7 is a flowchart of an embodiment method for authenticating a group of UEs.

FIG. 7 is a flowchart of an embodiment method 700 for authenticating a group of UEs, as may be performed by a SeAN. At step 710, the SeAN receives an authentication and data response including a first G_RES, a first set of RES(i)s, an AV_G, and an AV_M from an HSS. At step 720, the SeAN sends a group authentication request carrying the G_AUTN, the M_AUTN, and the one or more RANDs to a master device. At step 730, the SeAN receives a group authentication response carrying a second G_RES and a second set of RES(i)s from the master device. At step 740, the SeAN authenticates a group of UEs when the first G_RES matches carried by the authentication and data response matches the second G_RES carried by the group authentication response. At step 750, the SeAN authenticates individual UEs, within the group of UEs, by comparing each RES(i) in the first set of RES(i)s with a corresponding RES(i) in the second set of RES(i)s. If the respective RES(i)s match, then the corresponding UE is authenticated.

Figure 8:
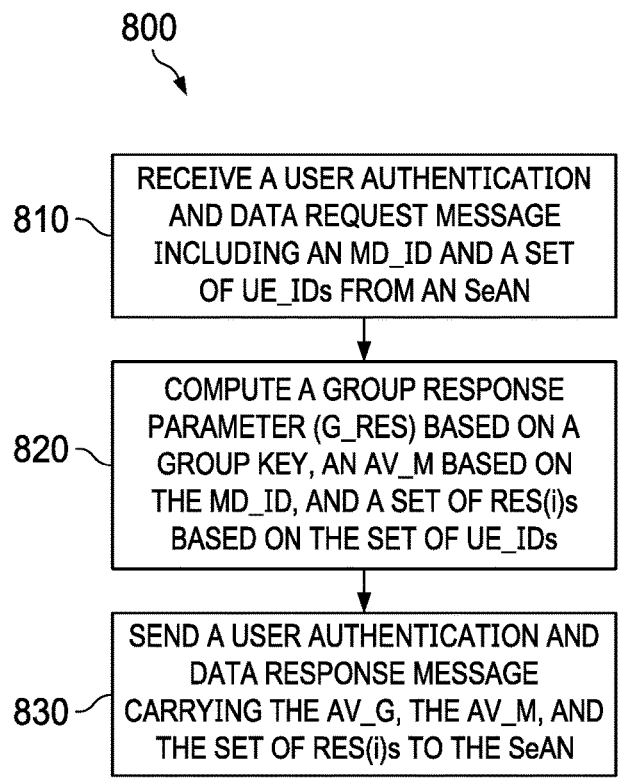
FIG. 8 is a flowchart of another embodiment method for facilitating authentication between an access network and a group of UEs.

FIG. 8 is a flowchart of an embodiment method 800 for facilitating authentication between an access network and a group of UEs, as may be performed by an HSS. At step 810, the HSS receives a user authentication and data request message including an MD_ID and a set of UE_IDs from an SeAN. At step 820, the HSS computes a G_RES based on a group key, an AV_M based on the MD_ID, and a set of RES(i)s based on the set of UE_IDs. At step 830, the HSS sends a user authentication and data response message carrying the AV_G, the AV_M, and the set of RES(i)s to the SeAN.

Figure 9:
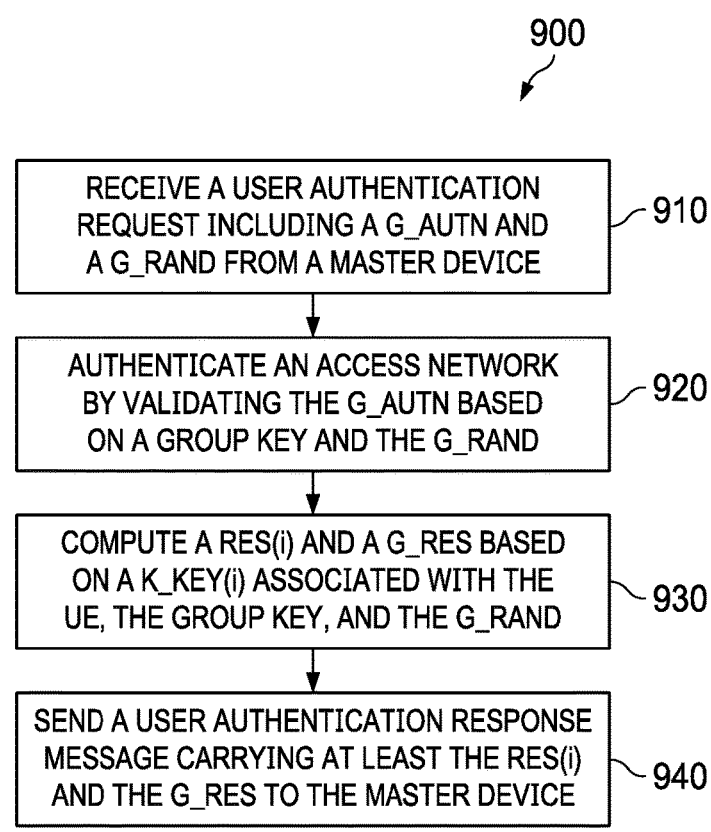
FIG. 9 is a flowchart of an embodiment method for authenticating a wireless network.

FIG. 9 is a flowchart of an embodiment method 900 for facilitating authentication of an access network, as may be performed by a UE in a group of UEs. At step 910, the UE receives a user authentication request including a G_AUTN and a G_RAND from a master device. At step 920, the UE authenticates an access network by validating the G_AUTN based on a group key and the G_RAND. At step 930, the UE computes a RES(i) and the G_RES based on a K_key(i) associated with the UE, the group key, and the G_RAND. At step 940, the UE sends a user authentication response carrying at least the RES(i) and the G_RES to the master device.

In some embodiments, an HSS may use a home network private key to compute a signature, e.g., a message authentication code (MAC) signature, of various information in an authentication data response and/or user authentication data response. By way of example, an HSS may use the home network private key to compute a MAC signature of the G_RAND and the G_AUTN, thereby generating a MAC [G_RAND+G_AUTN]. The MAC[G_RAND+G_AUTN] may then be communicated to another device (e.g., a master device, a UE, etc.) that is in possession of the home network public key, which may validate the MAC[G_RAND+G_AUTN] based on the home network public key in order to authenticate the HSS.

Figure 10A:
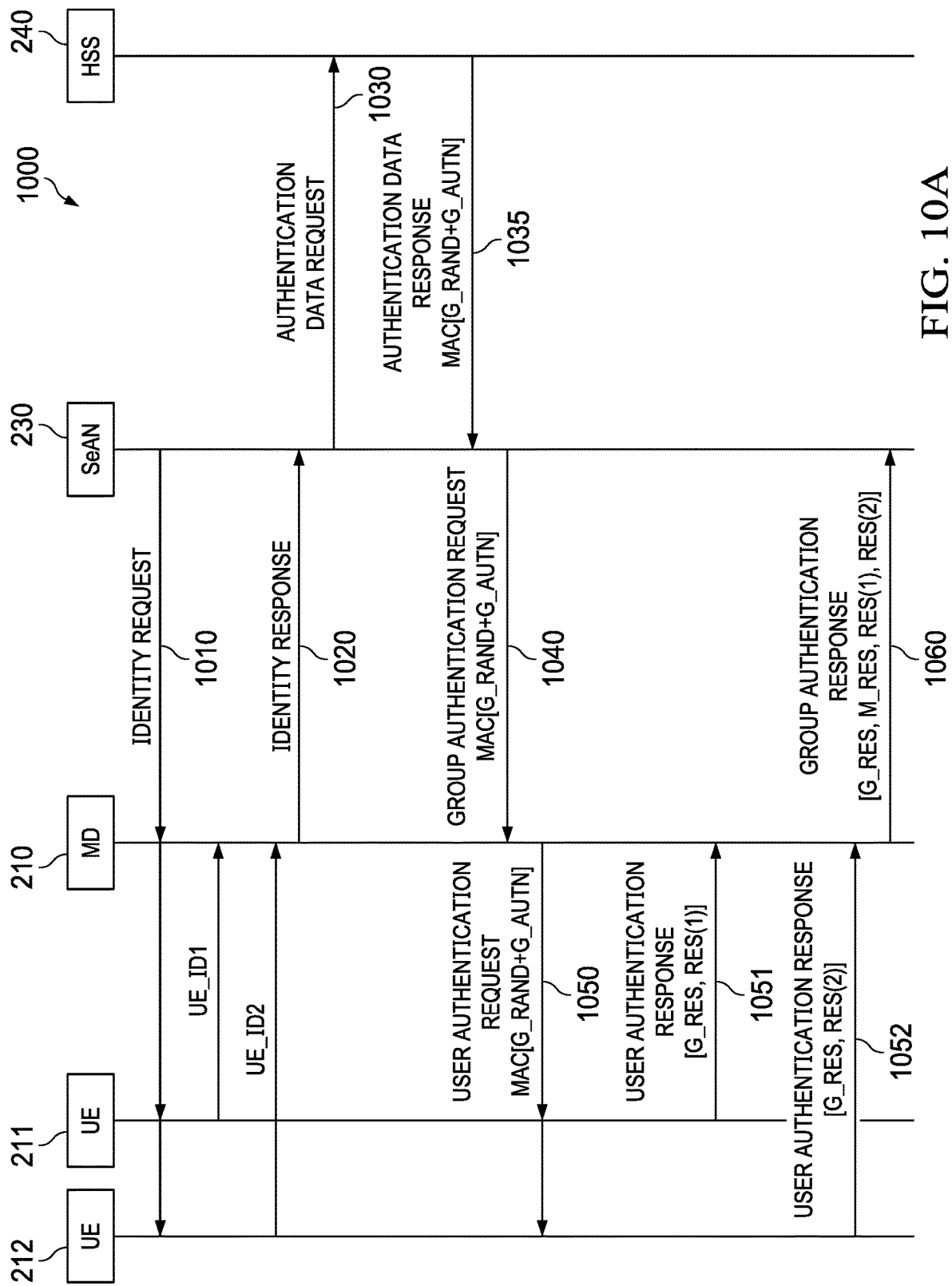
FIGS. 10A-10B are protocol diagrams of yet additional embodiment communications sequences for group authentication.
Figure 10B:
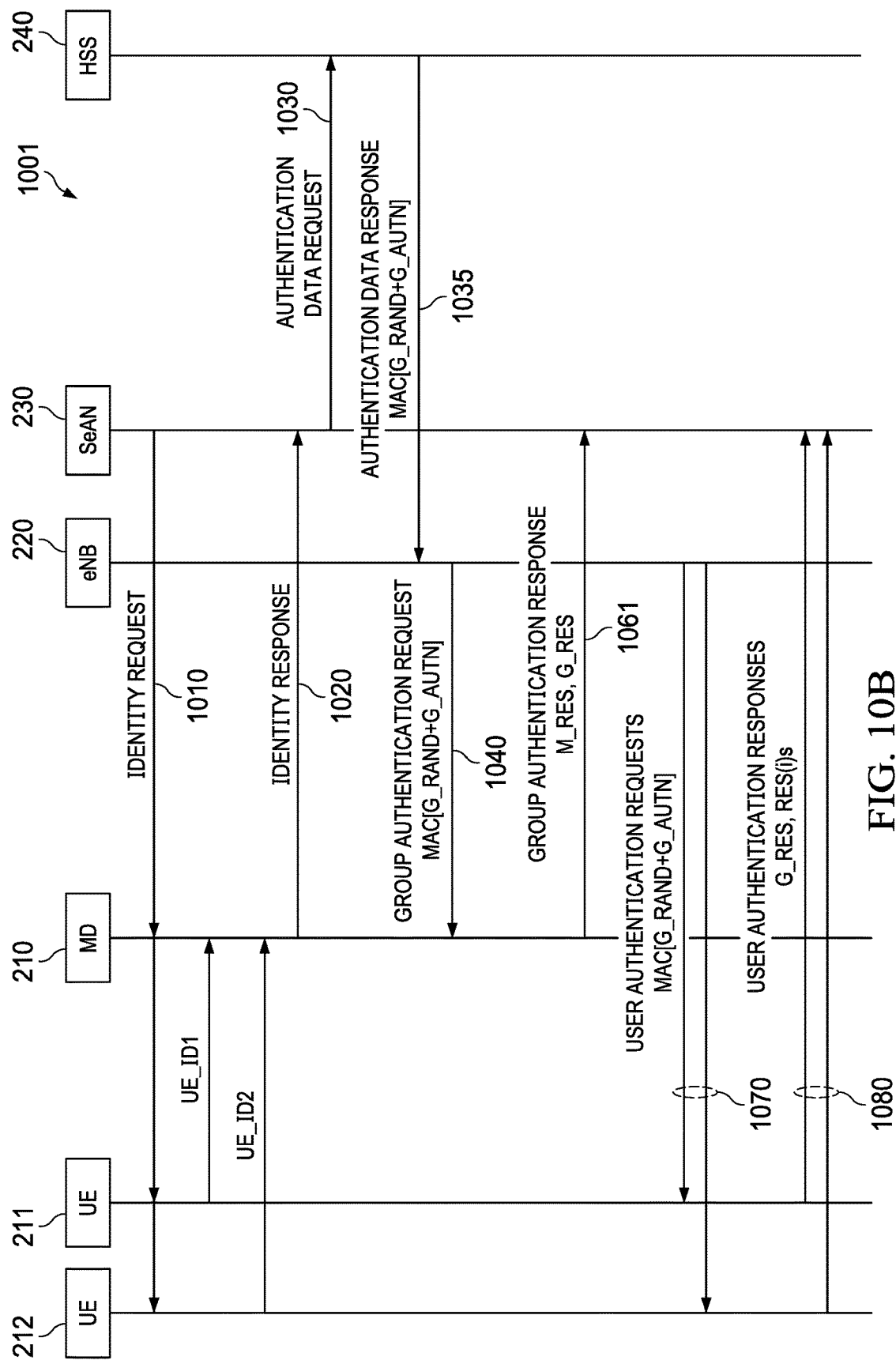

In some embodiments, the MAC[G_RAND+G_AUTN] is exchanged as part of an EPS-AKA protocol. FIGS. 10A and 10B illustrate protocol diagrams of embodiment communications sequences 1000, 1001 for exchanging a MAC [G_RAND+G_AUTN] in accordance with an EPS-AKA group authentication protocol. The identity request 1010, identify response 1020, authentication data request 1030, user authentication responses 1051, 1052, and group authentication response 1060 may be similar to the identity request 310, identify response 320, authentication data request 330, user authentication responses 351, 352, and group authentication response 360 depicted in FIG. 3. Likewise, the authentication data response 1035, group authentication request 1040, and user authentication request 1050 may be similar to the authentication data response 335, group authentication request 340, and user authentication request 350 depicted in FIG. 3, with the exception that the authentication data response 1035, group authentication request 1040, and user authentication request 1050 include the MAC[G_RAND+G_AUTN].

In FIG. 10A, the master device 210 may authenticate the HSS 240 by validating the MAC[G_RAND+G_AUTN] carried in the group authentication request 1040 based on the home network public key as well as the G_RAND and G_AUTN carried in the group authentication request 1040. The master device 210 may then send the user authentication request 1050 to the UEs 211, 212, which may then authenticate the HSS 240 by validating the MAC[G_RAND+G_AUTN] carried in the user authentication request 1050 based on the home network public key as well as the G_RAND and G_AUTN carried in the user authentication request 1050. Upon authenticating the HSS 240, the UEs 211, 212 may compute additional information (e.g., G_RES, M_RES, RES(i)s, etc.), send the user authentication responses 1051, 1052 to the master device 210. The master device may then send a group authentication response 360 to the SeAN.

In FIG. 10B, the MAC[G_RAND+G_AUTN] is transmitted directly from the base station 220 to the UEs 211, 212, rather than relaying the MAC[G_RAND+G_AUTN] through the master device 210. In particular, the master device 210 may authenticate the HSS 240 by validating the MAC[G_RAND+G_AUTN] carried in the group authentication request 1040 (like in FIG. 10A), and then send a group authentication response 1061 to the SeAN 230 via the base station 220. The group authentication response 1061 may be similar to the group authentication response 1060, except that the RES(i)s may be excluded from the group authentication response 1061. Thereafter, the base station 220 sends user authentication requests 1070 carrying the MAC[G_RAND+G_AUTN] to the UEs 211, 212. The user authentication requests 1070 may further include some or all of the information (e.g., G_RAND, G_AUTN, G_RES, etc. carried in the group authentication response 1060. The UEs 211, 212 may then authenticate the HSS 240 by validating the MAC[G_RAND+G_AUTN] carried in the user authentication requests 1070, compute additional information (e.g., G_RES, RES(i)s, etc.), send the user authentication responses 1080 to the SeAN 230.

Figure 11A:
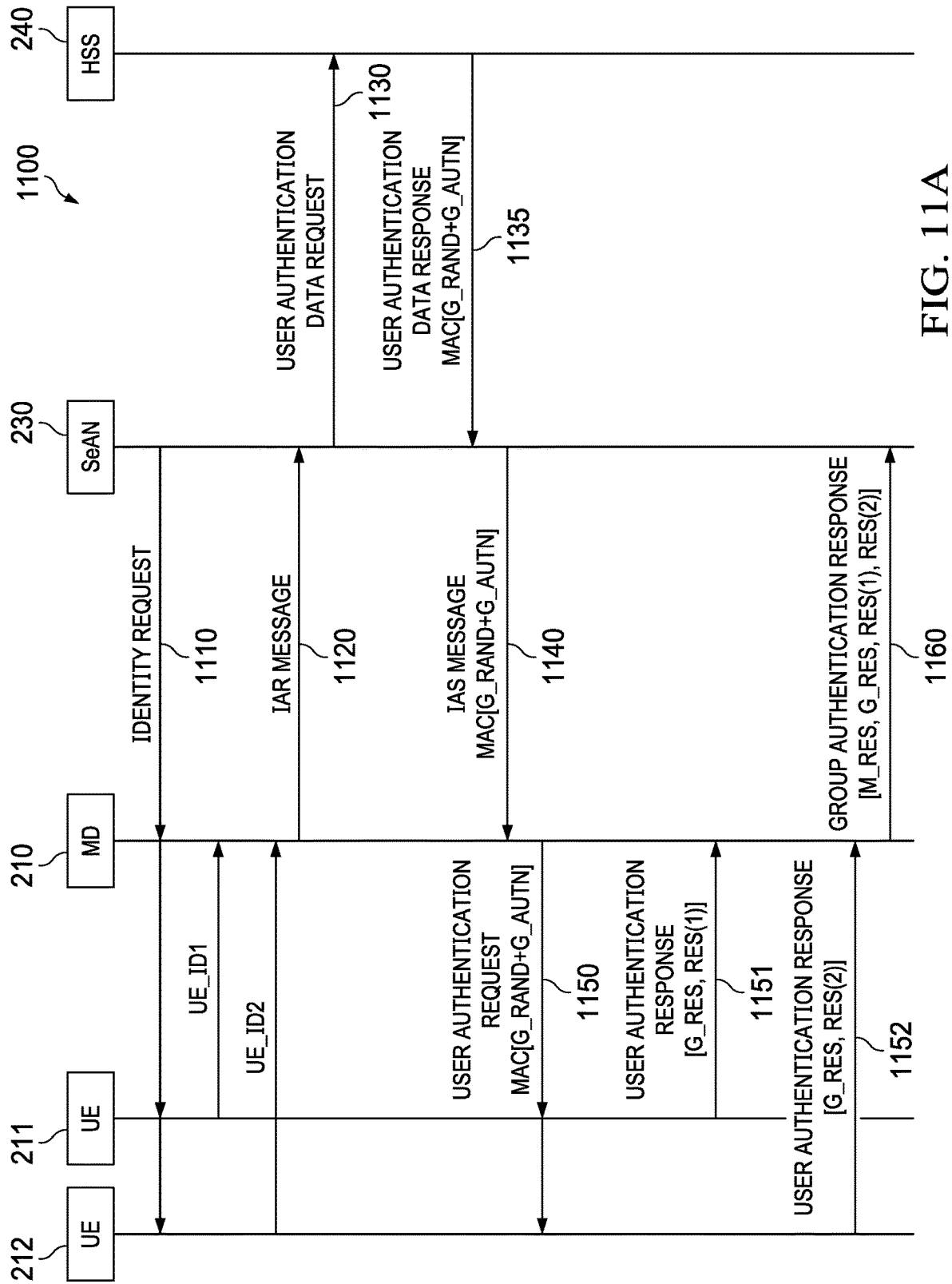
FIGS. 11A-11B are protocol diagrams of yet additional embodiment communications sequences for group authentication.
Figure 11B:
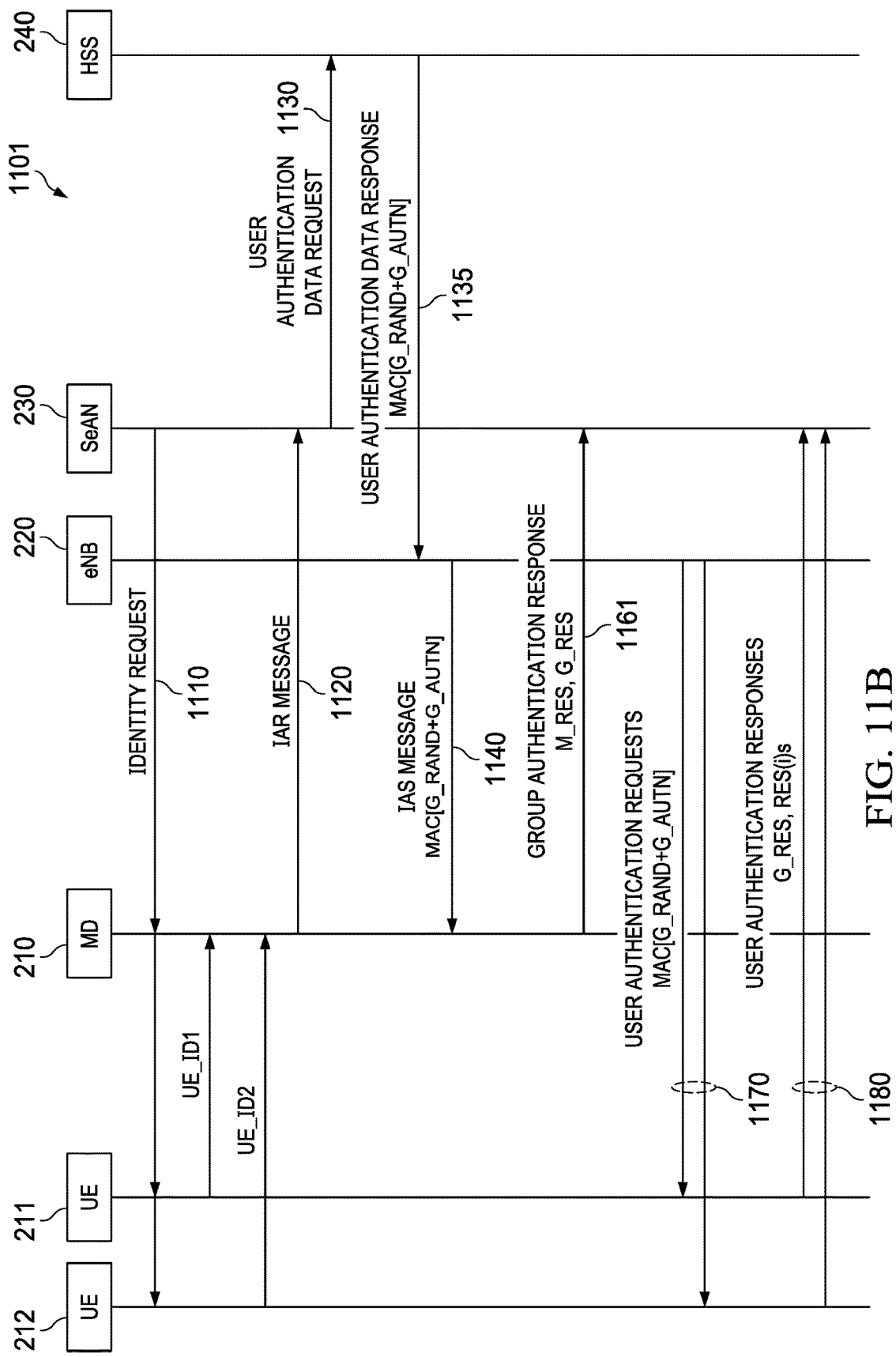

In other embodiments, the MAC[G_RAND+G_AUTN] is exchanged as part of a MASA protocol. FIGS. 11A and 11B illustrate protocol diagrams of embodiment communications sequences 1100, 1101 for exchanging a MAC[G_RAND+G_AUTN] in accordance with a MASA group authentication protocol.

The identity request 1110, IAR message 1120, authentication and data request message 1130, user authentication responses 1151, 1152, and group authentication response 160 may be similar to the identity request 410, IAR message 420, authentication and data request message 430, user authentication responses 451, 452, and group authentication response 460 depicted in FIG. 4. Likewise, the authentication and data response message 1135, IAS message 1140, and user authentication request 1150 may be similar to the authentication and data response message 435, IAS message 440, and user authentication request 450 depicted in FIG. 4, with the exception that the authentication and data response message 1135, IAS message 1140, and user authentication request 1150 include the MAC[G_RAND+G_AUTN]. In FIG. 11A, the MAC[G_RAND+G_AUTN] is sent from the SeAN 230 to the master device 210 via the IAS message 1140. The master device 210 then relays the MAC [G_RAND+G_AUTN] to the UE 211, 212 via the user authentication request 1150. Alternatively, in FIG. 11B, the MAC[G_RAND+G_AUTN] is sent from the base station 220 directly to the UEs 211, 212 via the user authentication requests 1170, which return the user authentication responses 1180 to the SeAN 230 after authenticating the HSS. The group authentication response 1161 may be similar to the group authentication response 1160, except that the RES(i)s may be excluded from the group authentication response 1161.

Figure 12:
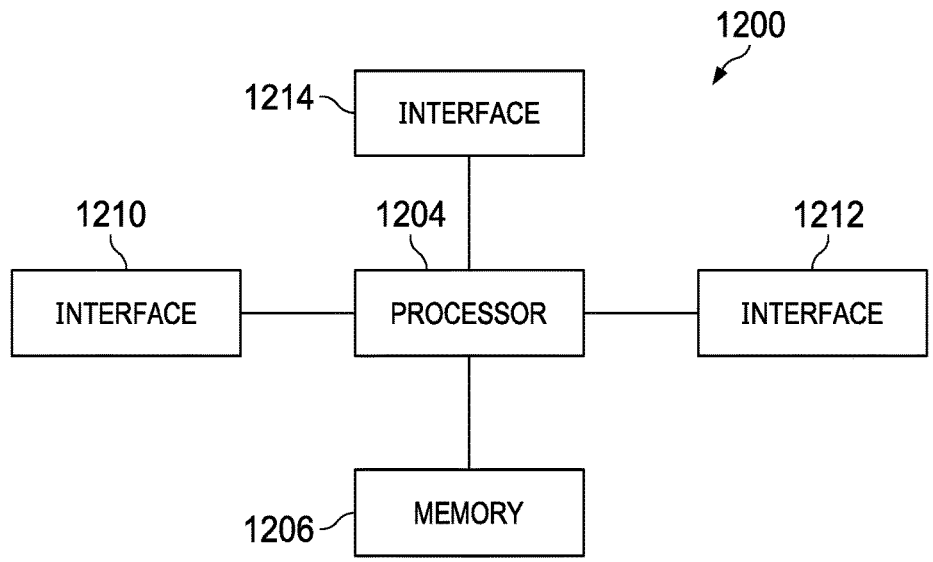
FIG. 12 is a diagram of an embodiment processing system.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
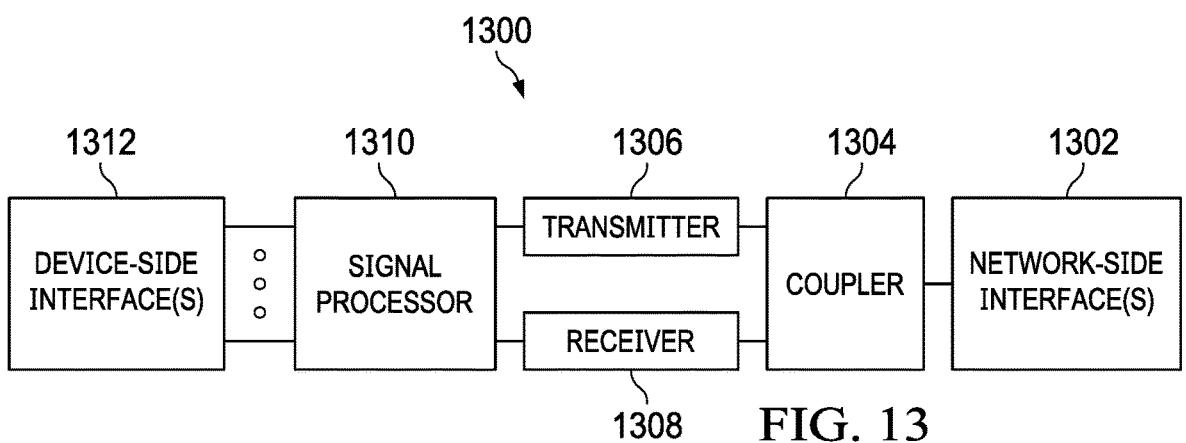
FIG. 13 is a diagram of an embodiment transceiver.

In some embodiments, one or more of the interfaces 1210, 1212, 1214 connects the processing system 1200 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for group authentication, the method comprising:

receiving, by a master device, a group authentication request from a base station in a wireless network for authenticating a group of user equipment (UEs), the group authentication request including a group authentication parameter (G_AUTN), a master authentication parameter (M_AUTN), and at least a group random number (G_RAND), the master device being an Internet of Things (IoT) relay or gateway in the wireless network;

authenticating, by the master device upon receiving the group authentication request from the base station and before requesting UEs in the group of UEs to authenticate the G_AUTN, the wireless network by validating at least the M_AUTN in accordance with at least a master key associated with the master device, and by validating the G_AUTN in accordance with a group key associated with the group of UEs, the master key being different than the group key;

sending, by the master device after the wireless network is authenticated successfully, user authentication requests to the UEs in the group of UEs requesting the UEs to authenticate the G_AUTN, each of the user authentication requests carrying at least the G_AUTN and the G_RAND;

receiving, by the master device, user authentication responses from at least some UEs in the group of UEs, the user authentication responses including individual response (RES(i)s); and sending, by the master device, a group authentication response carrying the RES(i)s to the base station.

2. The method of claim 1, wherein the RES(i)s are configured to be used for network-side authentication of individual UEs in the group of UEs.

3. The method of claim 1, wherein each of the RES(i)s is generated in accordance with a different individual pre-provisioned key (K_key(i)) associated with a UE from which the corresponding user authentication response was received.

4. The method of claim 1, further comprising:
generating, by the master device, a group response parameter (G_RES) based on the group key and the G_RAND carried by the group authentication request; and
validating each of the user authentication responses received from UEs in the group of UEs by comparing the G_RES generated by the master device with a G_RES indicator carried by the corresponding user authentication response.

5. The method of claim 1, further comprising:
generating, by the master device, a master device response parameter (M_RES) based on a master device key and the G_RAND carried by the group authentication request, wherein the M_RES is included in the group authentication response.

6. The method of claim 1, further comprising:
authenticating a home subscriber server (HSS) by validating a message authentication code (MAC) signature carried by the group authentication request in accordance with a home network public key, the G_RAND, and the G_AUTN.

7. The method of claim 1, wherein authenticating the wireless network further comprises validating the G_AUTN comprises:
validating the G_AUTN in accordance with the group key associated with the group of UEs and the G_RAND carried by the group authentication request.

8. The method of claim 7, wherein the M_AUTN is validated in accordance with a master device key and the G-RAND.

9. The method of claim 7, wherein the M_AUTN is validated in accordance with the master key and a separate random number (RAND) carried by the group authentication request, the separate RAND being different than the G_RAND.

10. A method for group authentication, the method comprising:
receiving, by a Security Anchor Node (SeAN), an authentication and data response message from a home subscriber server (HSS), the authentication and data response message including an expected group response parameter (G_XRES), a set of expected individual response parameters (XRES(i)s), group authentication information and master device authentication information;
generating, by the SeAN based on the group authentication information from the HSS, a group authentication parameter (G_AUTN) used for authenticating a group of user equipments (UEs) in accordance with a group key associated with the group of UEs;
generating, by the SeAN based on the master device authentication information from the HSS, a master authentication parameter (M_AUTN) used for authenticating a wireless network in accordance with a master key associated with a master device of the group of UEs, the master key different than the group key, and the master device being an Internet of Things (IoT) relay or gateway in the wireless network;
sending, by the SeAN, a group authentication request to the master device via a base station in the wireless network requesting authentication of the group of UEs, the group authentication request including the G_AUTN, the M_AUTN, and at least a group random number (G_RAND);
receiving, by the SeAN, a group authentication response from the master device, the group authentication response carrying a group response parameter (G_RES) and a set of individual response parameters (RES(i)s);
authenticating, by the SeAN, the group of UEs when the G_RES in the group authentication response received from the master device matches the G_XRES in the authentication and data response message received from the HSS; and
authenticating, by the SeAN, individual UEs, within the group of UEs, when a corresponding RES(i) in the group authentication response received from the master device matches a corresponding XRES(i) in the set of expected individual response parameters (XRES(i)s) in the authentication and data response message received from the HSS.

11. The method of claim 10, further comprising:
authenticating the master device when a master device response parameter (M_RES) in the group authentication response received from the master device matches an expected master device response parameter (M_XRES) in the authentication and data response message received from the HSS.

12. The method of claim 10, wherein the group authentication information and the master device authentication information include a group authentication vector (AV_G) and a master device authentication vector (AV_M).

13. The method of claim 12, wherein generating the G_AUTN and the M_AUTN comprises:
computing the G_AUTN and the M_AUTN based on the AV_G, the AV_M, and the G_RAND.

14. A master device being an Internet of Things (IoT) relay or gateway in a wireless network, the master device comprising:
a processor; and
a non-transitory computer readable storage medium storing programming for execution by the processor, the programming including instructions to:
receive a group authentication request from a base station in the wireless network for authenticating a group of user equipment (UEs), the group authentication request including a group authentication parameter (G_AUTN), a master authentication parameter (M_AUTN), and at least a group random number (G_RAND), the master device being an Internet of Things (IoT) telecommunications equipment in the wireless network;
authenticate, upon receiving the group authentication request from the base station and before requesting UEs in the group of UEs to authenticate the G_AUTN, the wireless network by validating at least the M_AUTN in accordance with at least a master key associated with the master device, and by validating the G_AUTN in accordance with a group key associated with the group of UEs, the master key being different than the group key;

sending, by the master device after the wireless network is authenticated successfully, user authentication requests to the UEs in the group of UEs requesting the UEs to authenticate the G_AUTN, each of the user authentication requests carrying at least the G_AUTN and the G_RAND;

receive user authentication responses from at least some UEs in the group of UEs, the user authentication responses including individual response (RES(i)s); and send a group authentication response carrying the RES(i)s to the base station.

15. The master device of claim 14, wherein the RES(i)s are configured to be used for network-side authentication of individual UEs in the group of UEs.

16. The master device of claim 14, wherein each of the RES(i)s is generated in accordance with a different individual pre-provisioned key (K_key(i)) associated with a UE from which the corresponding user authentication response was received.

17. The master device of claim 14, wherein the programming further includes instructions to:
generate a group response parameter (G_RES) based on the group key and the GRAND carried by the group authentication request; and
validate each of the user authentication responses received from UEs in the group of UEs by comparing the G_RES generated by the master device with a G_RES indicator carried by the corresponding user authentication response.

18. The master device of claim 14, wherein the programming further includes instructions to:
generate a master device response parameter (M_RES) based on a master device key and the G_RAND carried by the group authentication request, wherein the M_RES is included in the group authentication response.

19. The master device of claim 14, wherein the programming further includes instructions to:
authenticate a home subscriber server (HSS) by validating a message authentication code (MAC) signature carried by the group authentication request in accordance with a home network public key, the G_RAND, and the G_AUTN.

20. The master device of claim 14, wherein validating the G_AUTN comprises validating the G_AUTN in accordance with the group key associated with the group of UEs and the G_RAND carried by the group authentication request.

21. The master device of claim 20, wherein the M_AUTN is validated in accordance with a master device key and the G_RAND.

22. The master device of claim 20, wherein the M_AUTN is validated in accordance with the master key and a separate random number (RAND) carried by the group authentication request, the separate RAND being different than the G_RAND.

23. A Security Anchor Node (SeAN) comprising:
a processor; and
a non-transitory computer readable storage medium storing programming for execution by the processor, the programming including instructions to:
receive an authentication and data response message from a home subscriber server (HSS), the authentication and data response message including an expected group response parameter (G_XRES), a set of expected individual response parameters (XRES(i)s), group authentication information and master device authentication information, the SeAN being telecommunications equipment in a wireless network;
generate, based on the group authentication information from the HSS, a group authentication parameter (G_AUTN) used for authenticating a group of user equipments (UEs) in accordance with a group key associated with the group of UEs;
generate, based on the master device authentication information from the HSS, a master authentication parameter (M_AUTN) used for authenticating the wireless network in accordance with a master key associated with a master device of the group of UEs, the master key different than the group key, and the master device being an Internet of Things (IoT) relay or gateway in the wireless network;
send a group authentication request to the master device via a base station in the wireless network, requesting authentication of the group of UEs, the group authentication request including the G_AUTN, the M_AUTN, and at least a group random number (G_RAND);
receive a group authentication response from the master device, the group authentication response carrying a group response parameter (G_RES) and a set of individual response parameters (RES(i)s);
authenticate the group of UEs when the G_RES in the group authentication response received from the master device matches the G_XRES in the authentication and data response message received from the HSS; and
authenticate individual UEs, within the group of UEs, when a corresponding RES(i) in the group authentication response received from the master device matches a corresponding XRES(i) in the set of expected individual response parameters (XRES(i)s) in the authentication and data response message received from the HSS.

24. The SeAN of claim 23, further comprising:
authenticating the master device when a master device response parameter (M_RES) in the group authentication response received from the master device matches an expected master device response parameter (M_XRES) in the authentication and data response message received from the HSS.

25. The SeAN of claim 23, wherein the group authentication information and the master device authentication information include a group authentication vector (AV_G) and a master device authentication vector (AV_M).

26. The SeAN of claim 25, wherein generating the G_AUTN and the M_AUTN comprises
computing the G_AUTN and the M_AUTN based on the AV_G, the AV_M, and the G_RAND.

* * * * *

UNITED STATES PATENT AND TRADEMARK OFFICE
CERTIFICATE OF CORRECTION

PATENT NO. : 10,887,295 B2  
APPLICATION NO. : 15/720666  
DATED : January 5, 2021  
INVENTOR(S) : Ahmad Shawky Muhanna Page 1 of 1

It is certified that error appears in the above-identified patent and that said Letters Patent is hereby corrected as shown below:

In the Claims

In Column 15, Line 41-42, Claim 7, delete "authenticating the wireless network further comprises".

In Column 15, Line 49, Claim 8, delete "G-RAND" and insert --G_RAND--.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*